United States Patent
Crosby et al.

(10) Patent No.: US 10,929,728 B2
(45) Date of Patent: Feb. 23, 2021

(54) PRINTING NON-USER PATTERNS WITH A PRINT JOB

(71) Applicant: ELECTRONICS FOR IMAGING, INC., Fremont, CA (US)

(72) Inventors: Scott Crosby, Redwood City, CA (US); Haresh Joshi, Foster City, CA (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 16/507,584

(22) Filed: Jul. 10, 2019

(65) Prior Publication Data
US 2021/0012170 A1 Jan. 14, 2021

(51) Int. Cl.
*G06F 15/00* (2006.01)
*G06K 15/02* (2006.01)
*H04N 1/00* (2006.01)

(52) U.S. Cl.
CPC ....... *G06K 15/1885* (2013.01); *G06K 15/027* (2013.01); *G06K 15/1836* (2013.01); *H04N 1/00456* (2013.01); *H04N 1/00644* (2013.01)

(58) Field of Classification Search
CPC .......... G06K 15/1885; G06K 15/1836; G06K 15/027; H04N 1/00456; H04N 1/00644
USPC .......................................................... 358/1.2
See application file for complete search history.

(56) References Cited

U.S. PATENT DOCUMENTS

| | | | |
|---|---|---|---|
| 2006/0285161 A1* | 12/2006 | Otsuka | H04N 1/00034 358/1.18 |
| 2007/0199463 A1 | 8/2007 | Schonert | |
| 2016/0086070 A1* | 3/2016 | Kikumoto | G06K 15/1825 358/1.15 |

* cited by examiner

*Primary Examiner* — Mark R Milia
(74) *Attorney, Agent, or Firm* — Perkins Coie LLP

(57) ABSTRACT

The systems and methods presented here completely separate a non-user pattern from the user jobs being printed. In fact, depending on the number of images in the job and the number of patterns provided by the manufacturer or press operator, the patterns may appear on different images of the job each time the job is printed. This is because the image marks are generated and processed according to the configuration of ROUS, independent of the user jobs being printed.

20 Claims, 11 Drawing Sheets

PRINTING NON-USER PATTERNS WITH A PRINT JOB

TECHNICAL FIELD

The present application is related to printing, and more specifically to methods and systems that print non-user patterns along with a print job.

BACKGROUND

Currently, to print a non-user pattern along with a print job, these patterns must be manually inserted into the job via an application prior to submitting the job to the printer. These patterns, however, are static, namely, no matter how many copies of the job you print, the patterns are always the same, with the repeated pattern (or set of patterns) located in the same spot on each page every time. For example, a pattern can only contain the same colors contained in the print job. Further, the non-user pattern is always printed at the bottom of the page.

SUMMARY

The systems and methods presented here completely separate non-user patterns from the user jobs being printed. Cycling through a set of patterns in an order determined by the manufacturer or printer operator (i.e., "non-user") allows for any number of printer-specific tasks to be setup independent of the user jobs being printed. In fact, depending on the number of images in the job and the number of patterns provided by the manufacturer or printer operator, the patterns may appear on different images of the job each time the job is printed. This is because the patterns are generated and processed according to the needs of the manufacturer or printer operator, independent of the user jobs being printed.

DETAILED DESCRIPTION

The systems and methods presented here completely separate non-user patterns from the user jobs being printed. Cycling through a set of patterns in an order determined by the manufacturer or printer operator allows for any number of printer-specific tasks to be setup independent of the user jobs being printed. In fact, depending on the number of images in the job and the number of patterns provided by the manufacturer, the patterns may appear on different images of the job each time the job is printed. This is because the patterns are generated and processed according to the needs of the manufacturer or printer operator, independent of the user jobs being printed.

The system and methods presented here can enable management and/or control of the placement of raster data (unrelated to a print job) around the borders of any print job. This raster data could be nearly anything from a printer manufacturer's set of pre-defined, static print patterns used for nozzle-out and/or uniformity inspection, to a printer operator's dynamically generated patterns (such as print time, job name, or periodic length indicators) to be placed around the borders of any print job.

The Raster Overlay, Underlay, and/or Stitcher (ROUS) process is a universal, highly configurable software that supports overlaying (adding raster data on top of a user's page/image data, thereby replacing any overlapping raster), underlaying (adding beneath page/image raster data, replacing any overlapping blank/empty raster), and/or stitching (adding around existing page boundary, thereby increasing the overall output dimensions). The ROUS process can apply different raster data, i.e. patterns, to each image transferred to the printer/press—even for multiple copies of the same page/image in a user's job because this process is designed to be applied just prior to data transfer to the printer/press.

Figure 1:
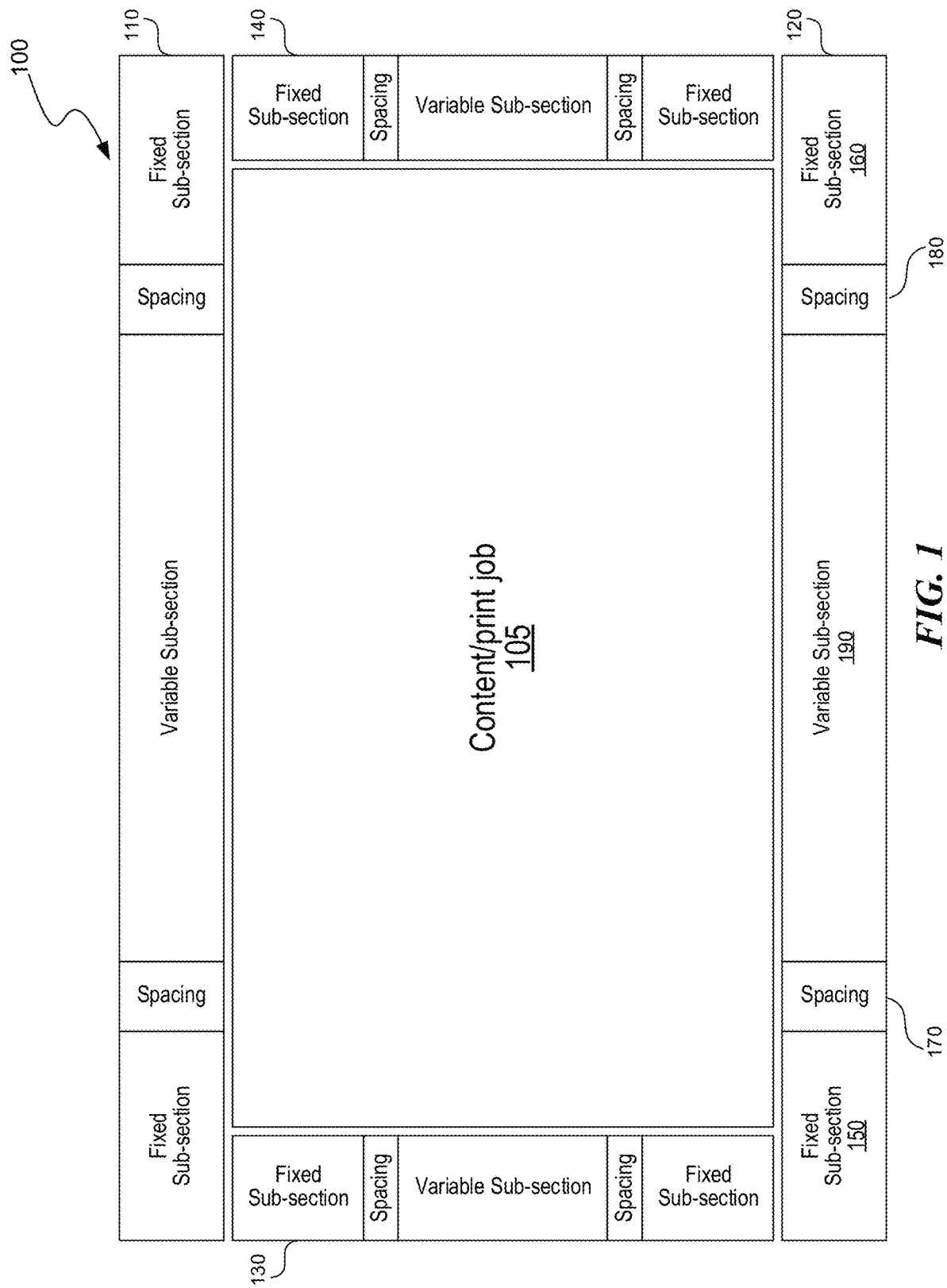
FIG. 1 shows a printing image layout that can contain a first task and a second task to print.

FIG. 1 shows a printing image layout that can contain a first task and a second task to print. The image can be printed on a substrate including plastic films or foils, release liner, textiles, plastic containers, any variety of paper (lightweight, heavyweight, coated, uncoated, paperboard, cardboard, etc.), and/or parchment. The first task can be content to print such as a print job, while the second task can be the raster data such as a pattern designed to test the functioning of a printer. The second task can be a non-user pattern, defined by various entities such as a printing operator, a printer manufacturer, and/or a processor implementing a ROUS process.

The ROUS process is defined by a layout 100 of the printing image. The ROUS process can define as many layouts 100 as needed, cycling through layouts 100 in a programmatic manner. The first task can be printed in the center region 105 while the second task can be printed in the peripheral regions defined by sections 110, 120, 130, 140.

Each layout 100 can support up to four sections-two horizontal sections 110, 120 (one for the top of the page/image and one for the bottom) and two vertical sections 130, 140 (one for the left of the page/image and one for the right). Each section 110, 120, 130, 140 can include two fixed sub-sections 150, 160 (only two labeled for brevity) at either end of the section 110, 120, 130, 140 and one variable sub-section 190 (only one labeled for brevity) between the two fixed sub-sections 150, 160. The sections 110, 120, 130, 140 are individually configurable, allowing a ROUS process/use to define: 1) if the section is enabled, 2) size of the section, 3) placement of the section, 4) spacing 170, 180 (only 2 labeled for brevity) between sub-sections, and 5) the mode (i.e., overlay, underlay, or stitch).

When the section 110, 120, 130, 140 is not enabled, the ROUS process does not print anything within that section, and the section 110, 120, 130, 140 can be used as a margin between two print job images. The size of the section 110, 120, 130, 140 can be adjusted to be larger or smaller. The section 110, 120, 130, 140 can be placed at the edge of the paper as shown in FIG. 1, or there can be a margin between the section and the edge of the paper.

The mode can specify how to combine the second task with any images associated with the print job that need to be printed in the sections 110, 120, 130, 140. When the mode is overlay, the ROUS process can add the second task on top of the print job to be printed in the sections 110, 120, 130, 140, thereby replacing any part of the print job that overlaps with the second task. When the mode is underlay, the ROUS process can add the second task beneath the print job to be printed in the sections 110, 120, 130, 140, thereby having the second task replace any blank space that overlaps with the second task. When the mode is stitch, the ROUS process can add the second task around the existing page boundary, in the sections 110, 120, 130, 140, thereby increasing the overall output dimensions.

Figure 2:
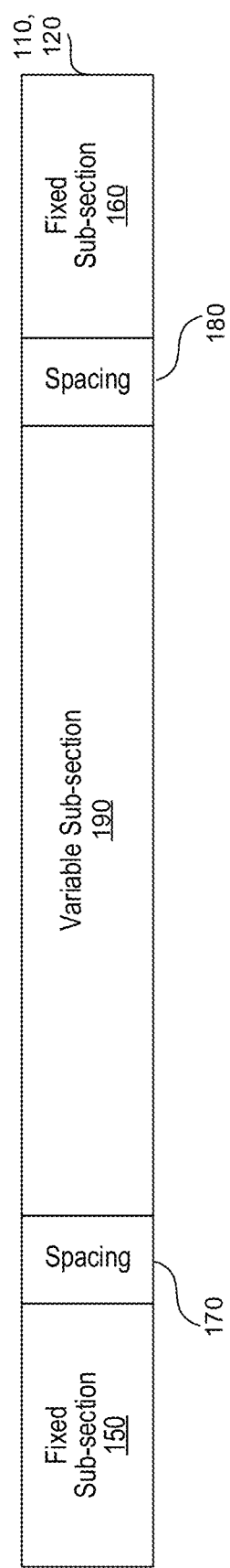
FIG. 2 shows a horizontal section.

FIG. 2 shows a horizontal section 110, 120 in FIG. 1. The ROUS process can individually configure each sub-section 150, 160, 190. The ROUS can define: 1) if the sub-section is enabled, 2) size of the sub-section, 3) alignment of the sub-section, and 4) the task to be associated with the sub-section. When the sub-section 150, 160, 190 is not enabled, the ROUS process does not print anything within that sub-section 150, 160, 190. The size of each sub-section 150, 160, 190 in the layouts 100 in FIG. 1 can be adjusted independently of all the other sub-sections in the layout 100.

Figure 3A:
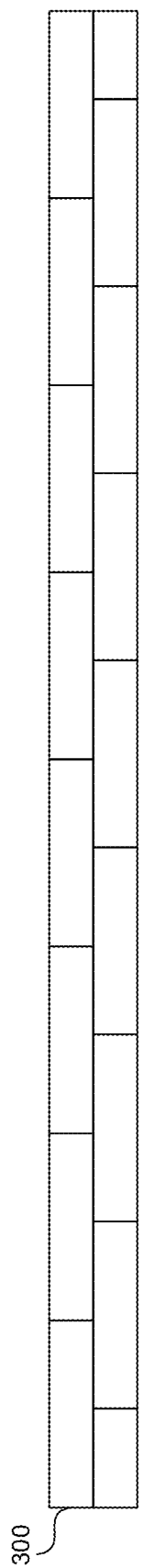
FIGS. 3A-3B show examples of manufacturer patterns that can be printed within the various sections.

In addition, for the middle, variable sub-section 190, the ROUS process can also define: 1) if the pre-defined task should be repeated within the sub-section, and if so, 2) the spacing between the repeated task. For example, the pre-defined task can include a nozzle-out pattern for black color as shown in FIG. 3A, and the nozzle-out pattern can be repeated within the variable sub-section 190 in black, or in a different color. Further, the ROUS process can adjust the spacing between the nozzle-out patterns.

The ROUS process can individually configure each task within the sub-section 150, 160, 190 and can define: 1) size of the task, 2) offset (both horizontal and vertical) of the task, and 3) byte alignment of the task. If the task dimensions are larger than the sub-section 150, 160, 190 in which the task is to be printed, the task can be automatically cropped. To define the size of the task, the ROUS process can manipulate the task by scaling, rotating, cropping, etc. To define the offset of the task, the ROUS process can translate the task. To define the byte alignment of the task, the ROUS process can determine whether to print the task at 1 byte, 2 bytes, 3 bytes, etc. boundary.

Figure 3B:
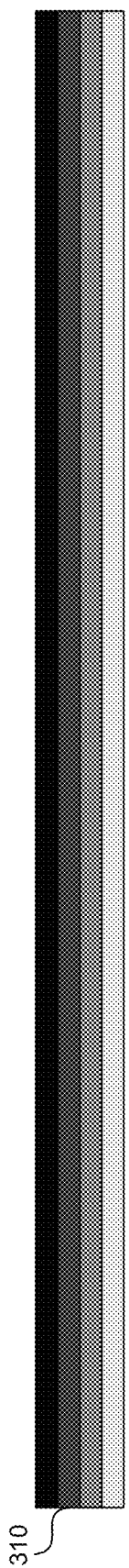

FIGS. 3A-3B show examples of manufacturer patterns that can be printed within the various sections 110, 120, 130, 140 in FIG. 1. One application of the ROUS process is the real-time printing of inline measurement test patterns for on-the-fly, nozzle-out and/or uniformity inspection. The test patterns 300, 310 usually consist of a handful of patterns for each ink that is supported by the printer/press. FIG. 3A shows a nozzle-out pattern 300 to test the nozzles printing black. FIG. 3B shows a uniformity pattern 310 to test uniformity of an ink used by the printer, which in FIG. 3B is black.

Figure 4A:
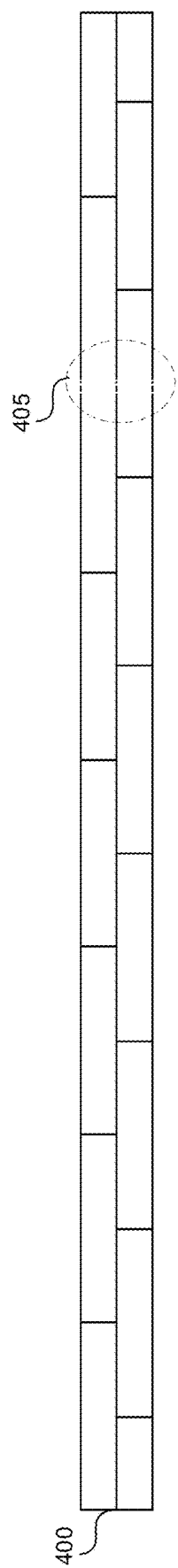
FIGS. 4A-4B show various errors that can be produced by printing patterns.
Figure 4B:
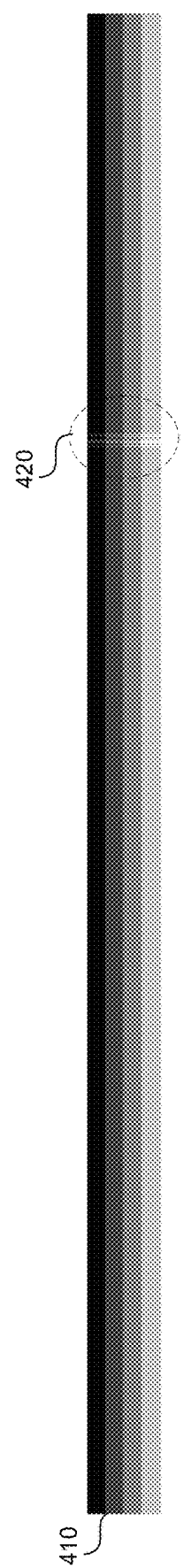

FIGS. 4A-4B show various errors that can be produced by printing patterns 300, 310 in FIGS. 3A-3B. Printed pattern 400 in FIG. 4A shows errors 405 (only one labeled for brevity) in printing. The error 405 can indicate that the nozzle is clogged, the printer head is misaligned, the printer head needs to be cleaned, etc. Printed pattern 410 in FIG. 4B shows errors such as vertical streaks 420. The error 420 can indicate that the printer is low on ink.

Upon detecting the error 420 a notification can be sent to a user to correct the errors, or in some cases, the errors can be corrected automatically. For example, when the printer head is misaligned, the printer head can be automatically moved, and the test pattern can be reprinted until the printed pattern 400 matches the pattern 300 in FIG. 3A.

Figure 5A:
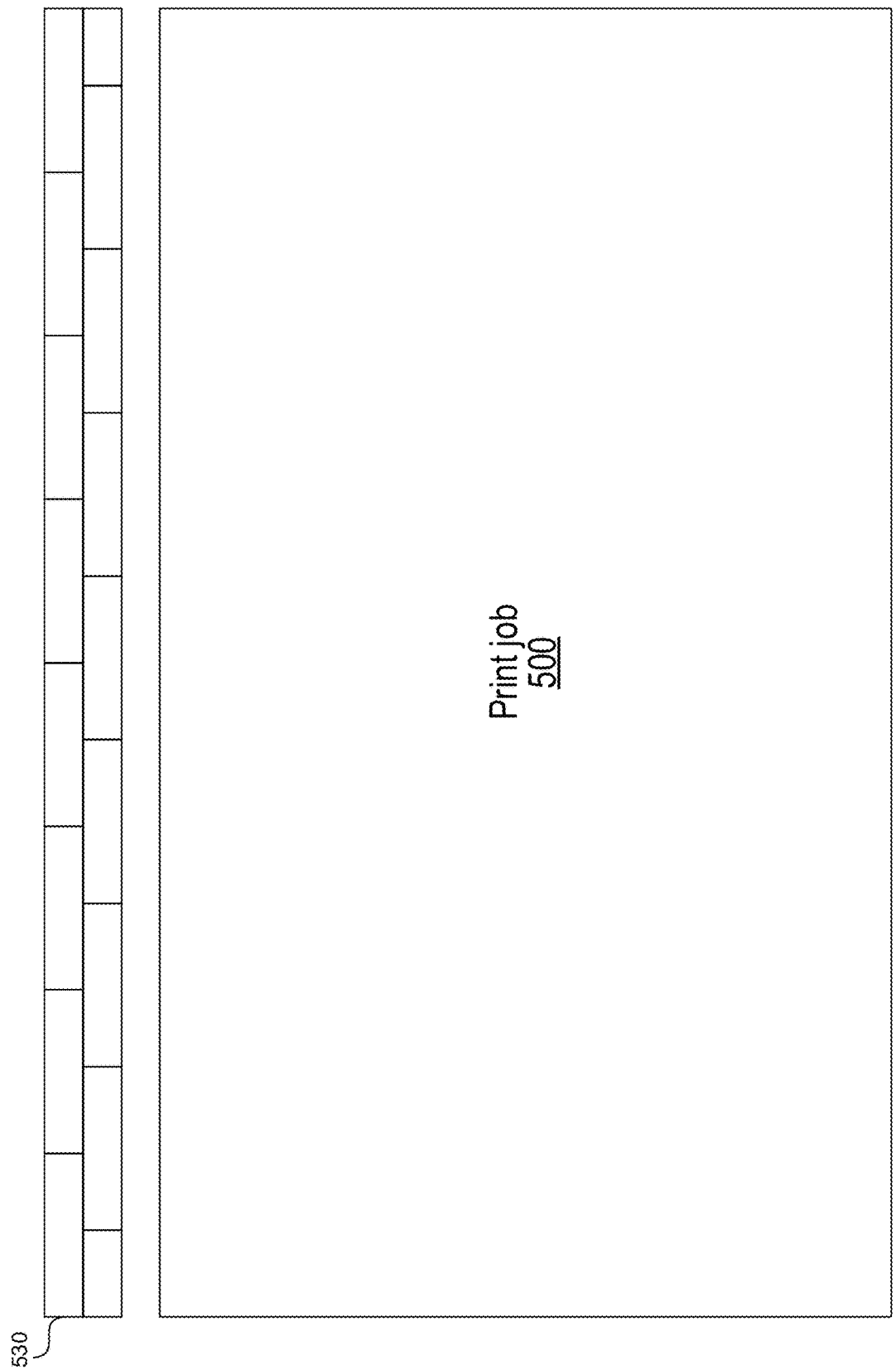
FIGS. 5A-5B show patterns printed along with a print job.
Figure 5B:
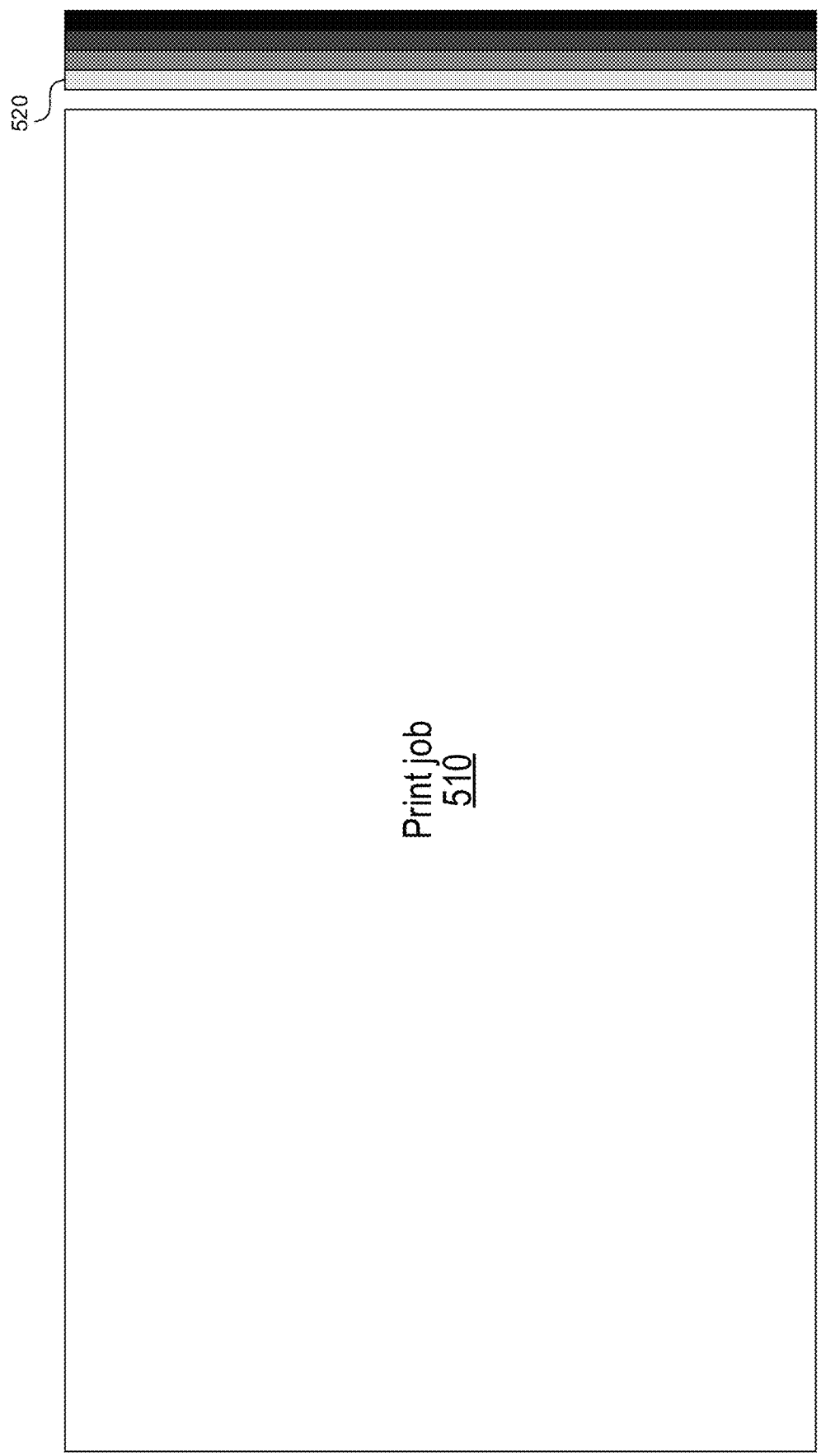

FIGS. 5A-5B show patterns 300 in FIG. 3A, 310 in FIG. 3B printed along with a print job. As shown in FIG. 5A, the nozzle-out pattern 300 is printed in the upper horizontal section 110 in FIG. 1 along with the print job 500 to produce printed nozzle-out pattern 530. As can be seen in FIG. 5A, the width of the fixed sub-sections and the variable sub-section has been adjusted as compared to FIG. 1. For example, to obtain FIG. 5A, the fixed sub-sections of section 110 can be disabled, while the variable sub-section can have its width adjusted to match the width of the print job 500. In the subsequent page of the print job, the variable sub-section can contain the nozzle-out image in a different color, such as red.

As shown in FIG. 5B, the uniformity pattern 310 in black color is printed in the right vertical section 140 in FIG. 1 along with the print job 510. Because the uniformity pattern 310 does not fit within the right vertical section 140, the uniformity pattern 310 has been cropped to obtain uniformity pattern 520. Uniformity pattern 520 can be printed within a fixed sub-section, or can be printed within the variable sub-section. When uniformity pattern 520 is printed within the fixed sub-section, the variable sub-section and the second fixed sub-section can be disabled, and the length of the enabled fixed sub-section can be adjusted.

The patterns 300, 310 can be pre-defined by the printer/press manufacturer to work with whatever measurement system such as the Dedot point system, the American point system, the metric system, etc. For example, a printer can have four colors, cyan, magenta, yellow, and black (CMYK). The manufacturer can create 10 nozzle-out patterns and one uniformity pattern for each color, for a total of 44 patterns.

The ROUS process can receive an input from the manufacturer to print one pattern at the top of each printed page. Alternatively, the ROUS process can determine that the print job contains more than 44 pages and can determine to print one pattern of the top of each page. If the print job contains less than 44 pages, the ROUS process can print multiple patterns within the sections 110, 120, 130, 140 in FIG. 1 of the page, to accommodate all 44 patents within the print job.

For example, if the ROUS process determines that the print job has 10 pages, the ROUS process can distribute 44 patterns within the various sub-sections 150, 160 in FIG. 1 to print all of the 44 patterns within 10 pages.

In another example, if the ROUS process determines the print job has one page, the ROUS process can print 12 patterns in each sub-section 150, 160 on the one page, and the remainder of the patterns can be printed in the margins of subsequent print jobs.

The manufacturer may want to print the nozzle-out patterns for all colors first (in order from cyan, magenta, yellow, to black), followed by the uniformity patterns for all colors (in order from cyan, magenta, yellow, to black). The manufacturer may want to print these patterns every 10,000 images/pages. All of this information can be used to configure the ROUS process resulting in the ROUS process printing 10,000 images/pages without any test patterns, followed by 44 images/pages (that would sequentially add the 10 cyan nozzle-out patterns, the 10 magenta nozzle-out patterns, the 10 yellow nozzle-out patterns, the 10 black nozzle-out patterns, the 1 cyan uniformity pattern, the 1 magenta uniformity pattern, the 1 yellow uniformity pattern, and the 1 black uniformity pattern individually to the top of the image/page), followed by 10,000 images/pages without any test patterns, and so on. The ROUS process can be configured using an input file specifying the desired printing sequence.

In another example, a user can be printing a thousand meters of a textile, and at every meter a label needs to be printed on the side of the textile, such as every 1 m, 2 m, 3 m, 4 m, etc. The ROUS process can disable the horizontal sections 110, 120 in FIG. 1 and a side section 140 in FIG. 1. The ROUS process can print the task within the side section 130 in FIG. 1. The task to print can be a 10-centimeter- or a 20-centimeter-long image. The ROUS process can print the task every 1 m, 2 m, 3 m, 4 m, etc. The ROUS process can be dynamic in the sense that if the printing task is stopped, the ROUS process can remember the next pattern that needs to be printed, so after the task is restarted, the next pattern is printed at 1 m spacing from the previous pattern.

In a more specific example, if after printing 100 meters, 200 meters, there is a problem in the printer, the printer may need to be stopped. When the printing resumes, the ROUS process can print the correct pattern in the correct location.

Figure 6:
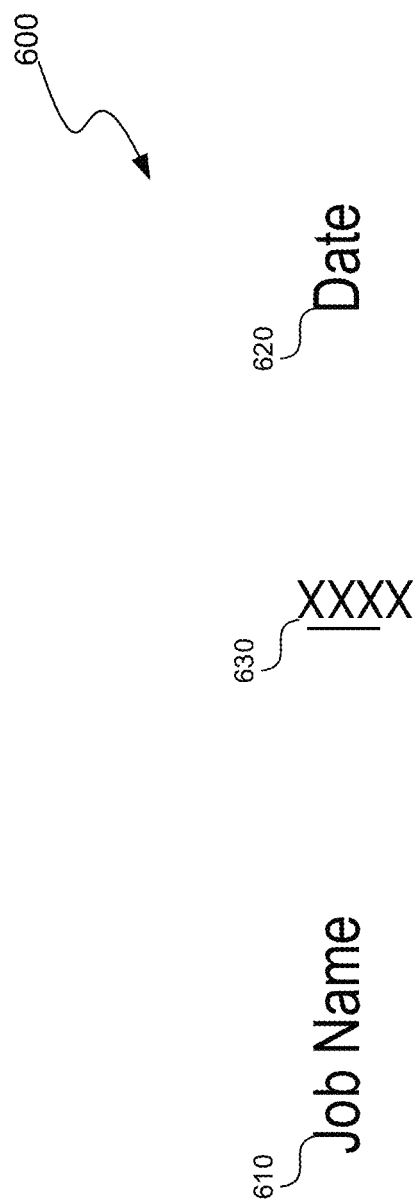
FIG. 6 shows an example of dynamic job information that can be printed within the various sections.

FIG. 6 shows a dynamic job information to be printed along edges of a printing image. The ROUS process can print job information 600 such as the job name 610, the date 620, and the current distance marker 630 in the sections 110, 120, 130, 140 in FIG. 1. The job name and the date can be same throughout printing, while the current distance marker 630 can change as the distance from the beginning of the print job increases.

The user, such as a printer/press operator, can specify one or more sections 110, 120, 130, 140 that contain the job information 600. Alternatively, the ROUS process can automatically determine a section where to print the job information 600 based on job size, whether the print job occupies a portion of the sections 110, 120, 130, 140, etc.

Figure 7:
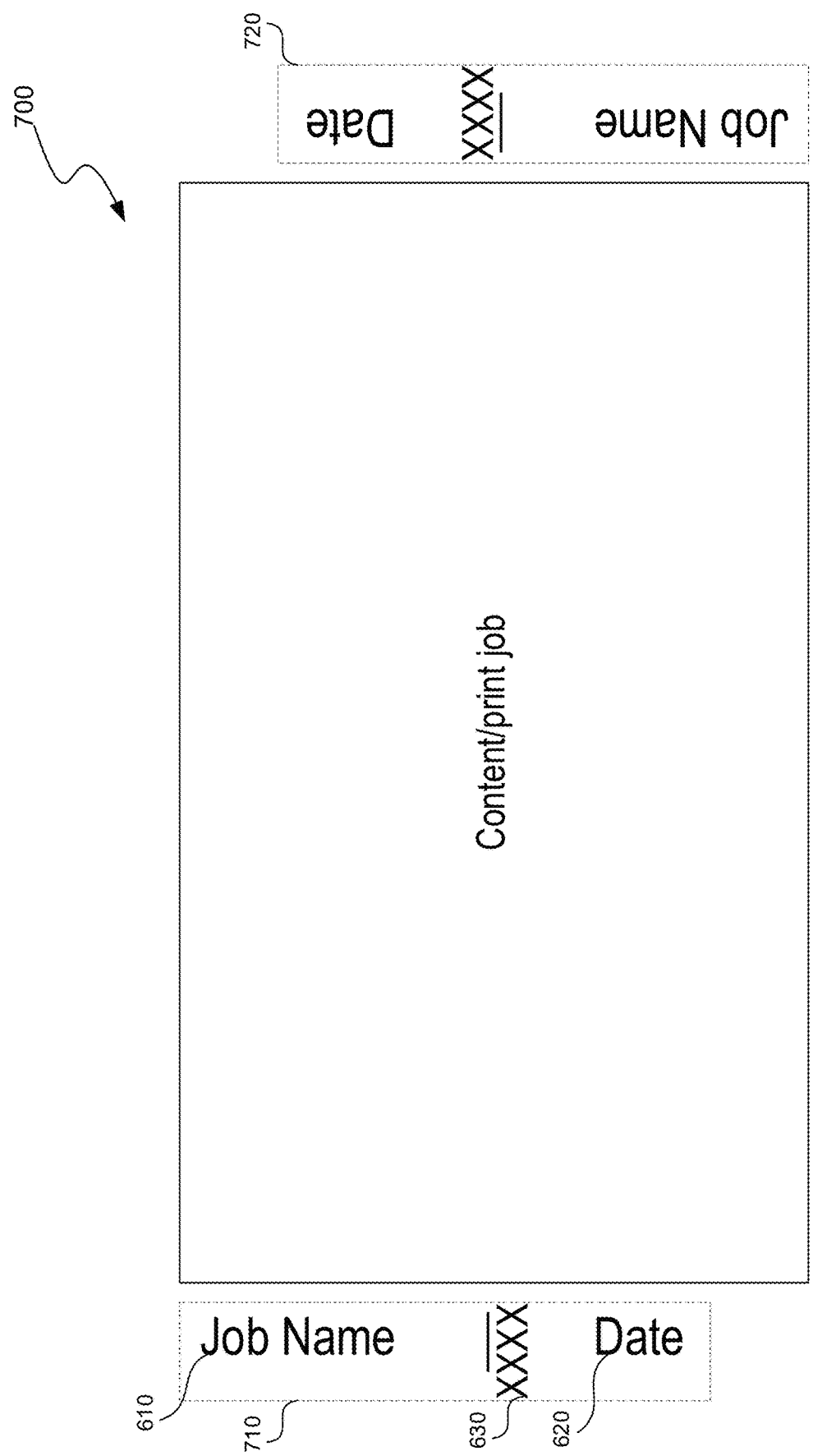
FIG. 7 shows a page layout containing the dynamic job information.

FIG. 7 shows a page layout containing the dynamic job information 600 in FIG. 6. The page layout 700 contains two instances 710, 720 of the dynamic job information 600, printed in the sections 130, 140 in FIG. 1. The job name 610 and the date can be static information during printing, while the distance marker 630 can be dynamic information. The job name 610 and the date 620 can be printed in the fixed sub-section or in the variable sub-section. The current distance marker 630 can be printed within the variable sub-section. For example, the job name 610, the date 620, and the current distance marker 630 can all be printed within a variable sub-section of sections 130, 140. In another example, the job name 610 and the current distance marker 630 can be printed in the variable sub-section, while the date 620 can be printed in a fixed sub-section. In a third example, the job name 610 can be printed in a first fixed sub-section, the distance marker 630 can be printed in the variable sub-section, while the date 620 can be printed in the second fixed sub-section.

In one example, the user can specify that the two instances 710, 720 of the dynamic job information 600 should be printed every 3 m. The ROUS process can be configured, for example via a configuration file, to print the two instances 710, 720 every 3 m. The ROUS process can dynamically calculate, while the print job is printing, where to add the job name 610, the current date 620, and can calculate the correct distance marker every 3 m for the duration of the print job. If the print job uses 10,000 m of printing substrate, then the ROUS process can add the two instances 710, 720 at 3, 6, 9, . . . 9996, and 9999 m.

In another example, the user can specify that the two instances 710, 720 of the dynamic job information 600 should be printed every 10 m. The ROUS process can be configured, for example via a command stream, to print the two instances 710, 720 every 10 m. The ROUS process can dynamically calculate, while the print job is printing, where to add the job name 610, the current date 620, and can calculate the correct distance marker every 10 m for the duration of the print job. If the print job uses 500 m of printing substrate, then the ROUS process can add the two instances 710, 720 at 10, 20, 30, . . . , 490 and 500 m.

Figure 8:
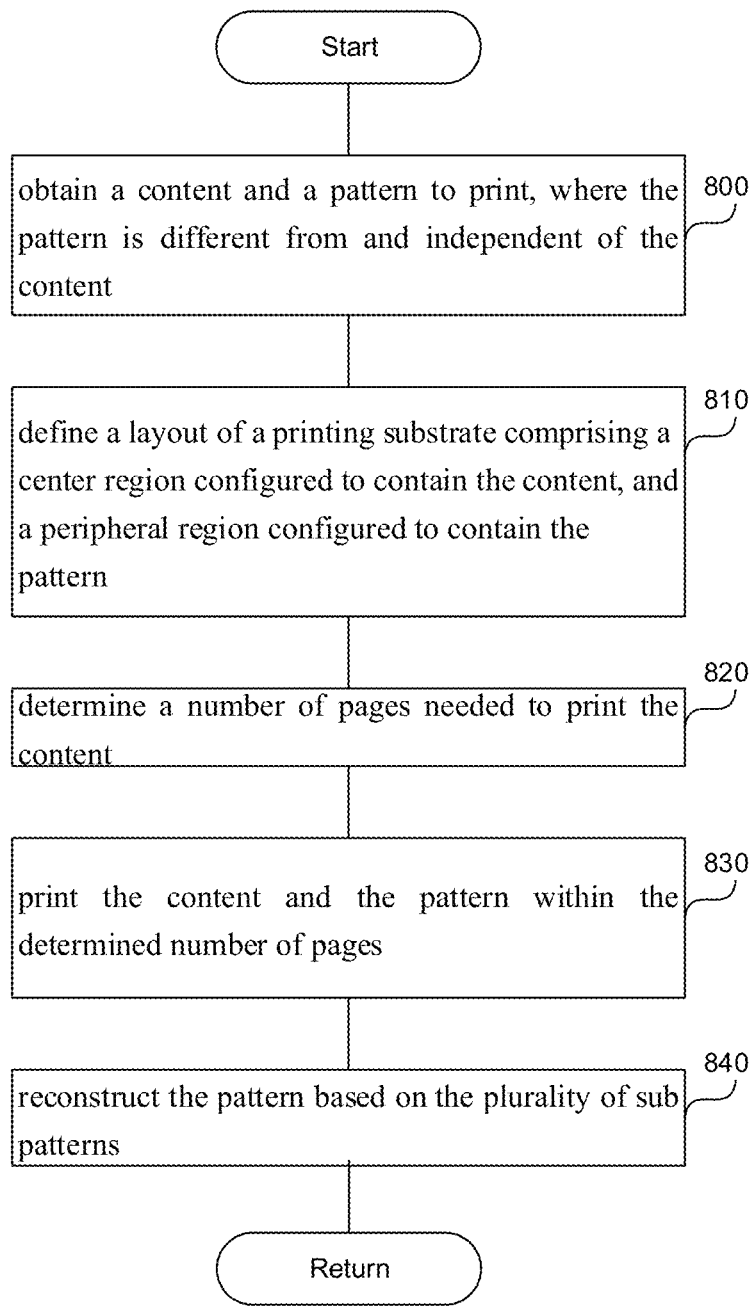
FIG. 8 is a flowchart of a method to test the printer performance.

FIG. 8 is a flowchart of a method to test the printer performance. In step 800, a processor can obtain a content and a pattern to print, where the pattern is different from and independent of the content. The pattern can be designed to test the functioning of a printer, such as a pattern to check a nozzle, i.e., a nozzle-out pattern as shown in FIG. 3A, or a pattern to check color uniformity, i.e. a uniformity pattern is shown in FIG. 3B. The content can be a print job containing an image, alphanumeric characters, etc.

In step 810, the processor can define a layout of a printing substrate including a center region configured to contain the content, and a peripheral region configured to contain the pattern as shown in FIG. 1. In step 820, the processor can determine a number of pages needed to print the content. The minimum number of pages can be 1. A page can be the maximum size of the canvas that the printer can print on. For example, the page can be a page of paper or an area of a textile that the printer can print on before creating a margin.

In step 830, the processor can print the content and the pattern within the determined number of pages by dividing the pattern into sub-patterns and rotating the sub-patterns to fit within a number of peripheral regions associated with the determined number of pages. The peripheral regions can include sections 110, 120, 130, 140 in FIG. 1.

In step 840, the processor can reconstruct the pattern based on the sub-patterns. For example, if the pattern contains the current distance, the processor can detect the current distance in multiple printouts, and arrange the distances and the printouts sequentially. The current distance can be measured from the beginning of the print job or can be measured from a predefined point within the print job. The processor can inspect the reconstructed pattern to detect an error in printing, as shown in FIG. 4A-4B.

Upon detecting the error in printing, the processor can determine a source of the error. The error can be a misaligned nozzle, clogged nozzle, low ink, misaligned printhead, etc. The processor can fix the source of the error by, for example, notifying the user of the determined source of the error. As another example, the processor can automatically fix the error, by for example incrementally aligning a nozzle in printing test patterns, until the test pattern is error-free.

Figure 9:
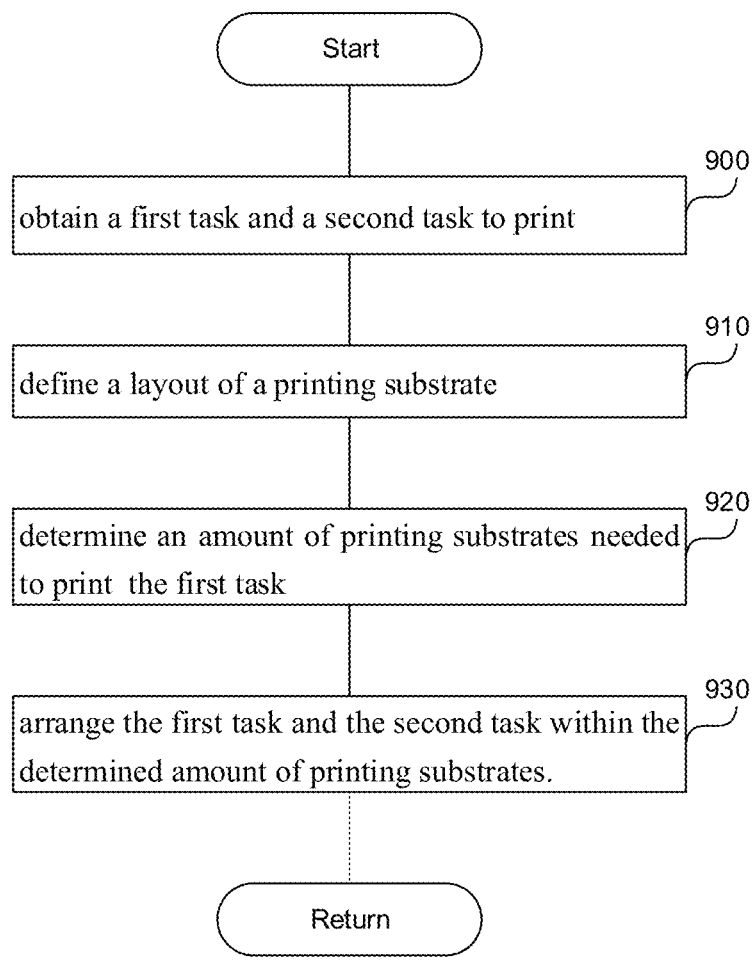
FIG. 9 is a flowchart of a method to control the placement of a pattern around the borders of a print job.

FIG. 9 is a flowchart of a method to control the placement of a pattern around the borders of a print job. In step 900, a processor can obtain a first task and a second task to print. The second task is different from and independent of the first task. The first task can be content or a print job provided by the user, while the second task can be a test pattern designed to test the performance of the printer, such as testing nozzle alignment, printhead alignment, nozzle clogging, ink intensity/uniformity, etc., as shown in FIGS. 3A-3B. The processor can run the instructions of the ROUS process.

In step 910, a processor can define a layout of a printing image including a center region configured to contain the first task, and a peripheral region configured to contain the second task, as shown in FIG. 1. The layout can be modified as described in this application.

In step 920, the processor can determine an amount of printing substrate needed to print the first task. The amount of printing substrate can be a number of pages, an area of the printing substrate, length of the printing substrate, etc. The printing substrate can be paper, textile, plastic, etc. A page can be a maximum size on which the printer can print. The amount of printing substrate is a positive number.

In step 930, the processor can arrange the first task and the second task within the determined amount of printing substrate by dividing the second task into sub-tasks configured to fit within a number of peripheral regions associated with the determined number of pages. To arrange the first task in the second task, the processor can manipulate one of the sub-tasks to fit within the peripheral region of the printing substrate by rotating the sub-pattern, adjusting a size of the sub-task, adjusting an offset of the sub-task, cropping, or adjusting a byte alignment of the sub-task.

For example, the processor can distribute the sub-tasks containing the second task over one or more first tasks, i.e., one or more print jobs. The initial print job can offer a limited amount of space such as 10 pages, and the second task can contain 70 sub-tasks. The processor can automatically determine that within those 10 pages only 4 out of the 70 sub-tasks can be printed. Further, the processor can determine how to manipulate the 4 sub-tasks over the 10 pages. Upon receiving the next print job, the processor can determine to print an additional 12 sub-tasks of the remaining 66 tasks. The processor can manipulate the 12 sub-tasks differently from the original 4 sub-tasks to, for example, reduce the amount of printing substrate used. In addition, the software can add metadata to each printed sub-pattern to indicate to the printer and a subsequent inspection system what sub-tasks are on each print job, to indicate where the sub-tasks are within each print job, to indicate a color associated with each sub-pattern, such as cyan, magenta or yellow, etc.

The instructions of the subsequent inspection system can be also executed by the processor. The processor can reconstruct at least a portion of the second task based on metadata and the multiple received sub-tasks. The processor can inspect the reconstructed portion of the second task to detect if there is an error in printing, such as shown in FIGS. 4A-4B. Upon detecting the error in printing, the processor can determine a source of the error, such as misaligned nozzles, clogged nozzles, low ink, a misaligned printhead, etc. The processor can cause the error to be fixed by, for example, automatically fixing the error or notifying the user to fix the error.

During printing, the processor can automatically detect an error in the first task. The processor can obtain the second task likely to identify a cause of the error. The processor can retrieve the second task from the database because the second task is associated with a similar error, or the processor can create a second task. The processor can print the second task to further test the printer. If the second task does not identify the cause of the problem, the process can be repeated iteratively, until the cause of the problem is identified and/or solved.

For example, the processor can notice that a cyan color has a mottled appearance. Consequently, the processor can determine that the nozzles printing cyan are nozzles 1-10 and can create the second task containing a shape of cyan color to be printed by the nozzles 1-10. However, the current print job does not have enough space to test all 10 nozzles. Consequently, the processor can determine to test only nozzle 1 when printing the current print job, nozzles 2 and 10 with a subsequent print job, nozzles 3, 5 and 9 in the subsequent job, etc. The processor can include metadata to indicate which nozzles are tested with which print job, because without the metadata, knowing which nozzle printed which cyan color is not possible. After examining the printed patterns and considering the metadata, the processor can determine that nozzles 8 and 9 are misaligned. To automatically fix the problem, the processor can iteratively and incrementally adjust the positions of nozzles 8 and 9 and print out test patterns for just nozzles 8 and 9, until the positions of nozzles 8 and 9 are properly aligned.

To define the layout in FIG. 1, the processor can define at most two horizontal sections including a top section to be printed at the top of the printing image and a bottom section to be printed at a bottom of the printing image, and at most two vertical sections including a left section to be printed on a left side of the printing image and a right section to be printed on a right side of the printing image. Each horizontal and vertical section can include at most two fixed sub-sections and at most one variable sub-section positioned between the at most two fixed sub-sections.

The processor can determine whether to enable at most two horizontal and at most two vertical sections. The processor can determine a size of each section among the two horizontal and the two vertical sections. The processor can determine a spacing between the two fixed sub-sections and the one variable sub-section.

The processor can determine whether to enable one or more of the two fixed sub-sections and the one variable sub-section. The processor can determine a size of each enabled sub-section of the two fixed sub-sections and the one variable sub-section. The processor can determine an alignment of each enabled sub-section of the two fixed sub-sections and the one variable sub-section. The processor can determine a sub-task in the sub-tasks to associate with each enabled sub-section.

In addition, for the middle, variable/dynamic sub-sections, the processor can also define: 1) if the pre-defined raster should be repeated within the sub-section, and if so, 2) the spacing between the repeated raster. When a sub-task of the raster is printed within the one variable sub-section, the processor can determine whether to repeatedly print the sub-task. Upon determining to repeat the sub-task, the processor can determine a spacing between the repeatedly printed sub-tasks.

The processor can determine whether a portion of the one or more first tasks occupies at least a portion of the peripheral region. Upon determining that the portion of the one or more first tasks occupies at least the portion of the peripheral region, the processor can combine the second task with the portion of the one or more first tasks by overlaying, underlaying or stitching the second task and the portion of the one or more first tasks.

The processor can obtain an indication of a separation between portions of the second task, such as 3 m, 5 pages, etc. The processor can measure a distance within the one or more first tasks. When the distance corresponds to the indicated separation between the portions of the second task, the processor can print an appropriate portion of the second task.

Computer

Figure 10:
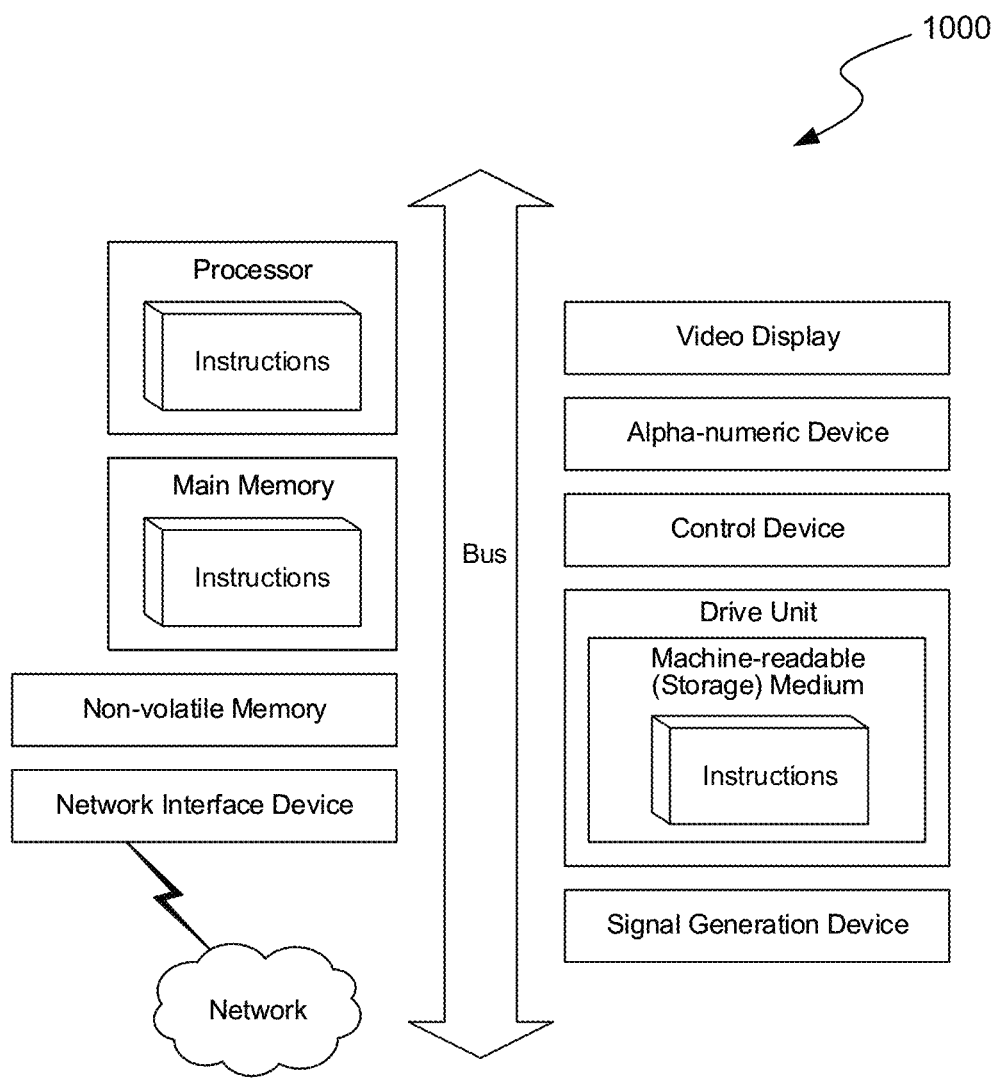
FIG. 10 is a diagrammatic representation of a machine in the example form of a computer system, within which a set of instructions for causing the machine to perform any one or more of the methodologies or modules discussed herein may be executed.

FIG. 10 is a diagrammatic representation of a machine in the example form of a computer system 1000 within which a set of instructions, for causing the machine to perform any one or more of the methodologies or modules discussed herein, may be executed.

In the example of FIG. 10, the computer system 1000 includes a processor, memory, non-volatile memory, and an interface device. Various common components (e.g., cache memory) are omitted for illustrative simplicity. The computer system 1000 is intended to illustrate a hardware device on which any of the components described in the example of FIGS. 1-9 (and any other components described in this specification) can be implemented. The computer system 1000 can be of any applicable known or convenient type. The components of the computer system 1000 can be coupled together via a bus or through some other known or convenient device.

The processor of the computer system 1000 can execute the methods described in this application. The processor can execute the ROUS process. The main memory, the nonvolatile memory and/or the drive unit can store the instructions and can store the first and the second task. The processor can communicate with the printer and/or the inspection system using the network of computer system 1000.

This disclosure contemplates the computer system 1000 taking any suitable physical form. As an example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1000. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed techniques and innovation.

In general, the routines executed to implement the embodiments of the disclosure, may be implemented as part of an operating system or a specific application, component, program, object, module or sequence of instructions referred to as "computer programs." The computer programs typically include one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may include a transformation, such as a physical transformation. With particular types of memory devices, such a physical transformation may include a physical transformation of an article to a different state or thing. For example, but without limitation, for some types of memory devices, a change in state may involve an accumulation and storage of charge or a release of stored charge. Likewise, in other memory devices, a change of state may include a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may include a transformation, such as a physical transformation. Rather, the foregoing is intended as illustrative examples.

A storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method comprising:
   obtaining a user-generated content, a non-user generated pattern to print, and a printing mode, wherein the non-user generated pattern is different from and independent of the user-generated content;
   defining a layout of a printing image comprising a center region configured to contain the user-generated content, and a peripheral region configured to contain the non-user generated pattern;

choosing between overlaying, underlaying and stitching the non-user generated pattern and the user-generated content based on the printing mode, wherein overlaying includes printing the non-user generated pattern over the user-generated content in the peripheral region, underlaying includes printing the non-user generated pattern under the user-generated content in the peripheral region, and stitching includes printing the non-user generated pattern around the user-generated content in the peripheral region;

determining a number of images needed to print the user-generated content; and printing the user-generated content and the non-user generated pattern within the determined number of images by dividing the non-user generated pattern into a plurality of sub-patterns and arranging the plurality of sub-patterns to fit within a number of peripheral regions associated with the determined number of images.

2. The method of claim 1, wherein the non-user generated pattern comprises a pattern to check a nozzle, or a pattern to check color uniformity.

3. A method comprising:

obtaining a first task to print, a second task to print, and a printing mode, wherein the second task is different from and independent of the first task;

defining a layout of a printing image comprising a center region configured to contain the first task, and a peripheral region configured to contain the second task;

choosing between overlaying underlaying and stitching the second task and the first task based on the printing mode, wherein overlaying includes printing the second task over the first task in the peripheral region, underlaying includes printing the second task under the first task in the peripheral region, and stitching includes printing the second task around the first task in the peripheral region;

determining a number of printing images needed to print the first task; and arranging the first task and the second task within the determined number of printing images.

4. The method of claim 3, comprising:

mapping the second task into a plurality of sub-tasks configured to fit within a number of peripheral regions associated with the determined number of image; and manipulating a sub-task in the plurality of sub-tasks to fit within the peripheral region of the printing image.

5. The method of claim 4, said manipulating comprising rotating, adjusting a size of the sub-task, adjusting an offset of the sub-task, cropping, or adjusting a byte alignment of the sub-task.

6. The method of claim 3, comprising:

mapping the second task into a plurality of sub-tasks configured to fit within a number of peripheral regions associated with the determined number of image; and reconstructing at least a portion of the second task based on the plurality of sub-tasks.

7. The method of claim 3, said defining the layout of the printing image comprising:

defining at most two horizontal sections comprising a top section to be printed at the top of the printing image and a bottom section to be printed at a bottom of the printing image and at most two vertical sections comprising a left section to be printed on a left side of the printing image and a right section to be printed on a right side of the printing image, wherein each horizontal and vertical section comprises at most two fixed sub-sections and at most one variable sub-section positioned between the at most two fixed sub-sections.

8. The method of claim 7, comprising:

determining whether to enable the at most two horizontal and the at most two vertical sections;

determining a size of each section among the at most two horizontal and the at most two vertical sections; and determining a spacing between the at most two fixed sub-sections and the at most one variable sub-section.

9. The method of claim 7, comprising:

determining whether to enable one or more of the at most two fixed sub-sections and the at most one variable sub-section;

determining a size of each enabled sub-section of the at most two fixed sub-sections and the at most one variable sub-section;

determining an alignment of each enabled sub-section of the at most two fixed sub-sections and the at most one variable sub-section; and determining a sub-task associated with the second task to associate with each enabled sub-section.

10. The method of claim 7, comprising:

when a sub-task associated with the second task is printed within the at most one variable sub-section, determining whether to repeatedly print the sub-task; and upon determining to repeat the sub-task, determining a spacing between the repeatedly printed sub-tasks.

11. The method of claim 3, wherein the second task comprises a pattern to check a nozzle, or a pattern to check color uniformity.

12. A system comprising a processor configured to:

obtain one or more first tasks to print, a second task to print, and a printing mode, wherein the second task is different from and independent of the one or more first tasks;

define a layout of a printing image comprising a center region configured to contain the one or more first tasks, and a peripheral region configured to contain the second task;

choose between overlaying, underlaying and stitching the second task and the one or more first tasks based on the printing mode, wherein overlaying includes printing the second task over the one or more first tasks in the peripheral region, underlaying includes printing the second task under the one or more first tasks in the peripheral region, and stitching includes printing the second task around the one or more first tasks in the peripheral region;

determine a number of printing images needed to print the one or more first tasks; and arrange the one or more first tasks and the second task within the determined number of printing images.

13. The system of claim 12, comprising the processor configured to:

determine whether a portion of the one or more first asks occupies at least a portion of the peripheral region; and upon determining that the portion of the one or more first tasks occupies at least the portion of the peripheral region, combine the second task with the portion of the one or more first tasks, the combining comprising overlaying, underlaying or stitching the second task and the portion of the one or more first tasks.

14. The system of claim 12, comprising the processor configured to:

dividing the second task into a plurality of sub-tasks configured to fit within a number of peripheral regions associated with the determined number of pages; and reconstruct at least a portion of the second task based on the plurality of sub-tasks.

15. The system of claim 12, the processor configured to define the layout of the printing image comprising the processor configured to:
define at most two horizontal sections comprising a top section to be printed at the top of the printing image and a bottom section to be printed at a bottom of the printing image and at most two vertical sections comprising a left section to be printed on a left side of the printing image and a right section to be printed on a right side of the printing image, wherein each horizontal and vertical section comprises at most two fixed sub-sections and at most one variable sub-section positioned between the at most two fixed sub-sections.

16. The system of claim 15, the processor configured to:
determine whether to enable the at most two horizontal and the at most two vertical sections;
determine a size of each section among the at most two horizontal and at most two vertical sections; and
determine a spacing between the at most two fixed sub-sections and the at most one variable sub-section.

17. The system of claim 15, the processor configured to:
determine whether to enable one or more of the at most two fixed sub-sections and the at most one variable sub-section;
determine a size of each enabled sub-section of the at most two fixed sub-sections and the at most one variable sub-section;
determine an alignment of each enabled sub-section of the at most two fixed sub-sections and the at most one variable sub-section; and
determine a sub-task associated with the second task to associate with each enabled sub-section.

18. The system of claim 12, comprising the processor configured to:
obtain an indication of a separation between portions of the second task;
measure a distance within the one or more first tasks; and
when the distance corresponds to the indicated separation between the portions of the second task, print an appropriate portion of the second task.

19. The system of claim 12, comprising the processor configured to manipulate a sub-task associated with the second task to fit within the peripheral region of the printing image.

20. The system of claim 19, the processor configured to manipulate comprising the processor configured to rotate, adjust a size of the sub-task, adjust an offset of the sub-task, crop, or adjust a byte alignment of the sub-task.

* * * * *